United States Patent [19]

Adkins

[11] Patent Number: 4,594,370

[45] Date of Patent: Jun. 10, 1986

[54] AMINE-FORMALDEHYDE MICROENCAPSULATION PROCESS

[75] Inventor: David G. Adkins, Chillicothe, Ohio

[73] Assignee: The Mead Corporation, Dayton, Ohio

[21] Appl. No.: 717,930

[22] Filed: Mar. 29, 1985

[51] Int. Cl.$^4$ .................................................. C08K 9/00
[52] U.S. Cl. ..................... 523/208; 264/4.7;
   427/213.34; 524/724; 524/732; 524/876; 524/877
[58] Field of Search ............... 523/208; 524/724, 732,
   524/876, 877; 427/213.34; 264/4.7

[56] References Cited

U.S. PATENT DOCUMENTS

| | | | |
|---|---|---|---|
| 3,516,941 | 6/1970 | Matson | 523/208 X |
| 3,755,190 | 8/1973 | Hart et al. | 264/4.7 X |
| 4,093,556 | 6/1978 | Wojciak | 252/316 |
| 4,100,103 | 7/1978 | Foris et al. | 264/4.7 X |
| 4,221,710 | 9/1980 | Hoshi et al. | 524/877 X |
| 4,371,634 | 2/1983 | Hoffman et al. | 523/208 |
| 4,396,670 | 8/1983 | Sinclair | 264/4.7 X |
| 4,423,091 | 12/1983 | Iwasaki et al. | 264/4.7 X |
| 4,428,983 | 1/1984 | Nehen et al. | 427/213.34 |
| 4,460,722 | 7/1984 | Igarashi et al. | 524/732 X |

*Primary Examiner*—Lucille M. Phynes
*Attorney, Agent, or Firm*—Biebel, French & Nauman

[57] ABSTRACT

A process for producing amine-formaldehyde microcapsules wherein the reaction of the amine and formaldehyde to form the microcapsule wall is carried out in the presence of a polyol as a systems modifier.

16 Claims, No Drawings

4,594,370

AMINE-FORMALDEHYDE MICROENCAPSULATION PROCESS

BACKGROUND OF THE INVENTION

The present invention relates to a process for forming microcapsules wherein the microcapsule wall is formed from an amine-formaldehyde resin. More particularly, it relates to a process for forming urea-formaldehyde microcapsules wherein the urea-formaldehyde resin is condensed in the presence of a polyol.

U.S. Pat. Nos. 4,089,802 and 4,001,140 describe a process for producing urea-formaldehyde microcapsules wherein the capsule wall is formed in the presence of a negatively charged polyelectrolyte. That polyelectrolyte is a carboxyl-substituted, linear aliphatic material. The function of the polyelectrolyte is that of a system modifier. The polyelectrolyte reportedly controls the formation of the condensation polymer such that the encapsulation process can be carried out without continually diluting the encapsulation medium as reportedly is required with earlier processes. The function of the modifier is reflected in a reduction in the viscosity of the system at higher polymer concentrations.

The system modifiers disclosed in U.S. Pat. Nos. 4,089,802 and 4,001,140 are maleic anhydride copolymers. Representative examples are isobutylene-maleic anhydride copolymer, ethylene-maleic anhydride copolymer, propylenemaleic anhydride copolymer, and butadiene-maleic anhydride copolymer. The molecular weight of these materials must exceed a certain minimum molecular weight to avoid gelling or thickening of the encapsulation medium.

SUMMARY OF THE INVENTION

The present invention resides in the discovery of a class of materials which are effective system modifiers for the formation of amine-formaldehyde microcapsules.

The process of the present invention provides for the formation of capsule walls from the condensation of formaldehyde and an amine such as urea, dimethylol urea, methylated dimethylol urea, or melamine in the presence of a polyol as a system modifier. The system modifier is present in dissolved form in the continuous aqueous phase of the encapsulation medium. Encapsulation proceeds via liquid-liquid phase separation. As the amine and formaldehyde react in the aqueous phase, the polymer builds to a molecular weight where it is no longer soluble and precipitates around the dispersed particles of core material which are oily or oleophilic materials. The polymer hardens upon further reaction and an impermeable microcapsule is obtained.

The process of the invention typically involves forming an agitating aqueous solution of the systems modifier having the core material dispersed therein and, while maintaining the dispersion, adding solutions of the amine and formaldehyde thereto. On reaction, an amineformaldehyde condensate separates from the solution which wets and enwraps the capsule core material. After the walls have been solidified, the capsules may be separated from the medium and washed.

The order of addition of the system modifier and the amine and formaldehyde solutions is important but open to substantial variation. In another embodiment, an aqueous solution of amine and the system modifier may be prepared before the core material is dispersed therein. The formaldehyde solution is then added and upon heating, the polymer forms, separates from solution and enwraps the core material.

A further alternative is to form an aqueous system containing the systems modifier and a water-soluble, urea-formaldehyde or melamine-formaldehyde precondensate (or prepolymer), into which the core material is dispersed. The precondensate is then reacted to form the resin which encapsulates the core material. As a practical matter, the capsule components can be mixed in any order provided that the polyol is present at the time the condensation reaction begins.

Because the order of addition of the encapsulation agents can vary, the present invention is most basically defined by reference to the encapsulation system as it exists immediately prior to forming the microcapsules. That system includes a continuous aqueous phase having the polyol and amine, formaldehyde, or an amine-formaldehyde precondensate dissolved therein, and a dispersed phase of the intended core material.

One method in accordance with the present invention involves the following steps:

(i) preparing an aqueous solution containing the polyol,
(ii) emulsifying the core material therein,
(iii) adding the amine to the system,
(iv) adding formaldehyde to the system,
(v) adding the acid catalyst,
(vi) polymerizing the urea and formaldehyde while stirring the system,
(vii) heating, and
(viii) reacting the excess formaldehyde.

The process is flexible. The amine could be added in step (i), (iv), (v) or (vi). The system modifier could be added in steps (iii), (iv) or (v), and the acid catalyst could be added in step (i), (iii) or (iv).

Another process involves the following sequence of steps:

(i) emulsifying an oil in an aqueous acid solution containing a polyol,
(ii) adding an aqueous solution of the amine,
(iii) adding an aqueous solution of resorcinol,
(iv) adding an aqueous solution of formaldehyde,
(v) heating to 65° C.,
(vi) adjusting the pH to 9.0,
(vii) adding a solution of sodium acid sulfite to scavenge excess formaldehyde, and
(viii) removing an aqueous dispersion of the microcapsules.

DETAILED DESCRIPTION OF THE INVENTION

While the discussions herein frequently make reference to the use of urea, it will be understood that urea derivatives such as dimethylol urea, methylated dimethylol urea, etc. as well as other amines such as melamine may also be used.

Polyols which are preferred for use in the present invention are low molecular weight (molecular weight less than 500) materials having three or more hydroxyl groups. A particularly preferred class of polyols are tetrahydroxyalkyl alkylenediamines of the formula

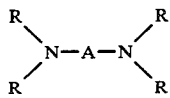

where each R represents a hydroxyalkyl group having 1 to 6 carbon atoms and A is an alkylene bridge having 1 to 4 carbon atoms. The respective R groups may be the same or different but are frequently the same in commercially available products. A particularly preferred polyol is N,N,N',N'-tetrakis(2-hydroxypropyl)ethylenediamine which is commercially available under the trademark QUADROL from BASF Wyandotte Corporation.

Polyols can be used alone or in combination with other systems modifiers such as the maleic anhydride copolymers mentioned above. Another modifier useful in combination with polyols is pectin or polygalacturonic acid.

The condensation reaction proceeds under acid conditions, e.g., pH of 7.0 or less; however, the reaction is preferably carried out at a pH in the range of 2.5 to 5.0. The temperature of the encapsulation medium should be maintained at about 10° to 95° C., preferably about 25° to 85° C. and more preferably about 45° to 75° C.

Among the acid catalysts that may be used are low molecular weight carboxylic acids, e.g., formic acid, acetic acid, etc.; inorganic acids, e.g., sulfuric acid, hydrochloric acid, phosphoric acid, etc.; and acidic or easily hydrolyzable salts such as aluminum sulfate, ammonium nitrate, ammonium chloride, ammonium sulfate, etc. Ammonium salts are preferred as they seem to provide a stronger and less permeable capsule. The ammonium salts are usually employed in an amount of about 2 to 20% by weight based on the amount of urea.

Urea and formaldehyde are preferably present in the encapsulation medium, whether as the free monomer or a precondensate, in a molar ratio of formaldehyde to urea of at least 1.5 and preferably about 2.0 to 3.0.

To reduce malodor and the incidence of skin irritation, when the polymerization reaction is complete, it is desirable to remove or react the excess formaldehyde. This can be accomplished by using any one of several known techniques such as the addition of phosphoric acid, urea, sulfite or bisulfite. These materials react with the formaldehyde to form a product which is easily removed from the medium. The addition of the urea or sodium sulfite to scavenge formaldehyde is preferably made in a single step after encapsulation and prior to storage. The pH and temperature of the medium should be adjusted for this reaction. The sulfite is preferably reacted at a pH of 6 to 8 at room temperature for about 2 hours. The urea can be reacted at a pH of 3 to 5 or 8 to 12 at a temperature of 30° to 60° C. for 4 hours.

A polyhydric phenol may be added to the reaction system for co-condensation with the urea and formaldehyde to improve permeability as desired. Suitable phenols are resorcinol, catechol, gallic acid, and the like. The phenols may be added in an amount of about 5 to 30% by weight based on the amount of urea.

Microcapsules prepared in accordance with the present invention are particularly advantageous for use in pressure-sensitive papers or photographic papers of the type described in U.S. Pat. Nos. 4,399,209 and 4,440,846 to Sanders et al. For these applications, the microcapsules preferably have a size of about 1 to 20 microns, more preferably 1.5 to 10 microns and most preferably 2 to 8 microns.

In some cases it may be desirable to use an emulsion stabilizer in the encapsulation. These are materials which form a thin layer around the capsule core entities and thereby stabilize the emulsion. Certain surfactants can be used for this purpose but, in particular, it may be desirable to add a polyisocyanate to the core material. This practice is described in detail in U.S. Pat. No. 4,353,809. The polyisocyanate is believed to react with water at the interface of the core material and the aqueous medium and form a thin layer of polymer which stabilizes the emulsion. Preferred polyisocyanates are SF-50, an aromatic triisocyanate manufactured by Union Carbide and N-100, a biuret of hexamethylene diisocyanate and water manufactured by Mobay Chemical Co. The isocyanate is typically added in an amount of about 0.005 to 3 parts per 100 parts of the core material and preferably 0.01 to 2 parts.

The capsule core material will vary with the function of the microcapsules. Core materials conventionally used in the carbonless paper art are also useful in the present invention. The materials include a color former and optionally an oil solvent. The encapsulation process of the present invention is particularly useful in forming photosensitive microcapsules as described in the aforementioned Sanders et al. patents. In these embodiments, the core material may be a combination of a photosensitive composition and a color former.

The invention will be illustrated in more detail by the following example.

EXAMPLE 1

An aqueous phase was prepared by placing 110 g water and 4.7 g N,N,N',N'-tetrakis(2-hydroxypropyl)ethylenediamine in a steel beaker under an overhead mixer carrying a six blade impeller. The solution was stirred until the diamine dissolved and 3.1 g sigma pectin was added with stirring. Then, 0.0625 g of cetyldimethylethylammonium bromide was added and the pH of the solution was adjusted to 4.0 with the addition of 20% $H_2SO_4$.

An oil phase containing 50 g trimethylolpropane triacrylate (TMPTA), 3 g Crystal Violet Lactone (CVL), and 5.1 g of a photoinitiator system was prepared and 3.2 g SF-50 and 6.6 g N-100 was added thereto.

The oil phase was emulsified into the aqueous phase with stirring at 3,000 rpm over a period of 10 minutes. The rate of stirring was reduced to 2,000 rpm and the following solutions were added at 2 minute intervals in order: (i) 16.6 g of 50% urea, (ii) 0.8 g of resorcinol in 5.0 g water, (iii) 21.4 g of 37% aqueous formaldehyde, and (iv) 1.5 g of 40% ammonium sulfate. After stirring for 5 minutes at room temperature, the temperature of the emulsion was increased to 65° C. and cured for 2 hours. The pH of the emulsion was then adjusted to 9.0 by adding 20% NaOH. To react excess formaldehyde, 2.8 g of sodium bisulfite was added and the emulsion was allowed to cool to room temperature with stirring.

EXAMPLE 2

An aqueous phase was prepared consisting of 110 g water and 9.4 g N,N,N',N'-tetrakis(2-hyroxypropyl)ethylenediamine. After stirring to dissolve the diamine, 3.1 g of sigma pectin was added with stirring. The pH of the solution was then adjusted to 4.0 with the addition of 60% $H_2SO_4$.

An oil phase was prepared consisting of 50 g TMPTA, 3.0 g CVL and 5.1 g of a photoinitiator system. The oil phase was emulsified into the aqueous phase with stirring at 3,000 rpm for 10 minutes. Stirring was reduced to 2,000 rpm and solutions (i)-(iv) from Example 1 were added at 2 minute intervals. The resulting emulsion was stirred at room temperature for 6 minutes and the temperature was then raised to 65° C. for 2 hours. The pH of the emulsion was adjusted to 9.0 and sodium bisulfite was then added as in Example 1 above.

Having described the invention in detail and by reference to preferred embodiments thereof, it will be apparent that modifications and variations are possible without departing from the scope of the invention defined in the appended claims.

What is claimed is:

1. A process for producing microcapsules which comprises:

forming an agitating aqueous system having discrete particles of an oily core material dispersed therein, said aqueous system being a solution of a polyol and an amine or an amine-formaldehyde precondensate, and condensing formaldehyde with the amine to form a condensation product which is insoluble in said system and which forms a solid capsule wall surrounding said particles of core material wherein said polyol has the structural formula

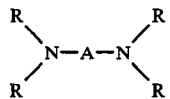

where A is an alkylene bridge having 1 to 4 carbon atoms and each R represents a hydroxyalkyl group having 1 to 6 carbon atoms.

2. The process of claim 1 wherein said polyol has a molecular weight less than about 500 and has three or more hydroxyl groups.

3. The process of claim 2 wherein said polyol has the structural formula

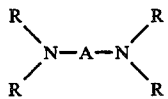

where A is an alkylene bridge having 1 to 4 carbon atoms and each R represents a hydroxyalkyl group having 1 to 6 carbon atoms.

4. The process of claim 2 wherein said polyol is N,N,N',N'-tetrakis(2-hydroxypropyl)ethylenediamine.

5. The process of claim 4 wherein said condensation product is a urea-formaldehyde resin.

6. The process of claim 4 wherein said condensation product is melamine-formaldehyde resin.

7. The process of claim 1 wherein said process further comprises adding a solution containing a polyhydric phenol to said aqueous system.

8. The process of claim 1 wherein after forming said microcapsules, said process comprises the additional step of reacting any excess formaldehyde to remove it.

9. A process for producing microcapsules which comprises:

establishing an agitating aqueous system including a polyol as a a system modifier, dispersing in said system particles of an oily core material substantially insoluble in said system, adding sequentially or simultaneously an aqueous solution of urea and an aqueous solution of formaldehyde to said system having said particles of core material dispersed therein, and reacting said urea and formaldehyde in the presence of said polyol to form a condensation product which is insoluble in said system and which forms a solid capsule wall around said particles of core material, wherein said polyol is a diamine of the formula

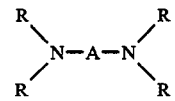

where each R is a hydroxyalkyl group and A is an alkylene bridge.

10. The process of claim 9 wherein said polyol is N,N,N',N'-tetrakis(2-hydroxypropyl)ethylenediamine.

11. The process of claim 9 wherein said process comprises the additional step of adding a polyhydric phenol to said aqueous system.

12. The process of claim 11 wherein said phenol is resorcinol.

13. The process of claim 9 wherein said oily core material includes a photosensitive composition.

14. The process of claim 1 wherein said oily core material includes a photosensitive composition.

15. The process of claim 1 wherein said oily core material includes a polyisocyanate.

16. The process of claim 9 wherein said oily core material includes a polyisocyanate.

* * * * *